United States Patent [19]
Koops

[11] Patent Number: 5,256,101
[45] Date of Patent: Oct. 26, 1993

[54] METHOD AND APPARATUS FOR CUTTING OPEN THE STOMACH OF A BIRD

[75] Inventor: Henderikus Koops, Oostzaan, Netherlands

[73] Assignee: Machinefabriek Meyn B.V., Oostzaan, Netherlands

[21] Appl. No.: 876,409

[22] Filed: Apr. 30, 1992

[30] Foreign Application Priority Data

May 24, 1991 [NL] Netherlands ............ 9100895

[51] Int. Cl.⁵ ............................................. A22C 21/06
[52] U.S. Cl. ................................... 452/120; 452/123; 452/160
[58] Field of Search ............... 452/120, 123, 121, 106, 452/160, 122, 173

[56] References Cited

U.S. PATENT DOCUMENTS

| | | | |
|---|---|---|---|
| 2,455,675 | 12/1948 | Hawk | 452/123 |
| 3,290,722 | 12/1966 | Norks | 452/123 |
| 3,402,426 | 9/1968 | Wexel | |
| 3,916,482 | 11/1975 | Kvilhaug | |
| 3,925,846 | 12/1975 | Leander | 452/106 |
| 4,192,040 | 3/1980 | Gielnik | 452/119 |
| 4,270,243 | 6/1981 | Lewis | 452/160 |
| 4,536,919 | 8/1985 | Cashwell et al. | 450/160 |

FOREIGN PATENT DOCUMENTS

| | | |
|---|---|---|
| 3516082 | 11/1986 | Fed. Rep. of Germany. |
| 3516083 | 11/1986 | Fed. Rep. of Germany. |
| 3714677 | 11/1988 | Fed. Rep. of Germany. |
| 7613251 | 11/1976 | Netherlands. |
| 8005029 | 9/1980 | Netherlands. |
| 8908983 | 10/1989 | World Int. Prop. O.. |
| 9006685 | 6/1990 | World Int. Prop. O.. |

Primary Examiner—Willis Little
Attorney, Agent, or Firm—Dority & Manning

[57] ABSTRACT

Method and apparatus for cutting open the stomach of a bird comprising a cutting means shaped as a nozzle for ejecting a high pressure liquid jet. For obtaining an optimised cutting action the nozzle preferably is displaceable away from or towards the stomach to be processed. Constructively it is preferable that the nozzle is mounted at the outer end of an arm pivoting in a vertical plane said outer end engaging the stomach through guiding means, such as a follower roll.

17 Claims, 1 Drawing Sheet

METHOD AND APPARATUS FOR CUTTING OPEN THE STOMACH OF A BIRD

BACKGROUND OF THE INVENTION

The invention relates to a method for cutting open the stomach of a bird, especially the stomach of a turkey and to an apparatus for carrying out said method, comprising a cutting means and positioning means for positioning the stomach relative to the cutting means.

While processing birds for obtaining products to be sold one of the steps comprises cutting open the stomach which previously has been eviscerated from the bird in a way know per se. After the stomach has been cut open its contents are removed and, using a so called stomach peeler, the stomach membrane is separated from the stomach.

In a known method and apparatus for cutting open the stomach of a bird the cutting means comprises a rotating knife. The stomach is guided along the rotating knife through the positioning means in such a way that a cut is made along the entire length of a stomach wall, after which the stomach as it were may be folded open to a planar position. In this open position the contents of the stomach can be removed and the stomach can be supplied to the stomach peeler.

Such a known method and apparatus, in which the cutting means comprises a rotating knife, have several disadvantages. The setting of the rotating knife should occur extremely precisely in order to avoid that the cut made by the rotating knife not only extends in one stomach wall but also in the opposite stomach wall. In this respect it is complicating that the stomachs of different birds have different dimensions.

Especially when cutting open the stomach of turkeys the application of a rotating knife offers another disadvantage. It is not uncommon that turkeys swallow pebbles or alike. These pebbles reach the stomach and the rotating knife cannot be prevented from hitting these pebbles. As a result the knife quickly gets blunt and has to be sharpened or has to be replaced by a new knife.

OBJECTS AND SUMMARY OF THE INVENTION

It is an object of the invention to provide a method and apparatus in which the mentioned disadvantages are removed in a simple but nevertheless effective way.

Thus the method according to the invention is characterized in that at least one high-pressure liquid jet is used for cutting only one stomach wall and for internally pressurizing the stomach.

Surprisingly it appears that using such a liquid jet the stomach of the bird can be cut open in an extremly effective way. The highly pressurized liquid jet enters through the respective wall of the stomach and into the stomach cavity. There the pressure of the liquid jet has diminished so far that the opposite stomach wall is not damaged. However, the liquid jet creates a pressure rise in the stomach cavity which supports the cutting action of the liquid jet in such a way that starting from the already made cut the stomach as it were bursts open. Thus the high pressure liquid jet functions in two ways: at one hand for making a cut in the stomach wall and at the other hand for creating an internal pressure in the stomach cavity such as to further tear open the stomach wall as starting from that cut. This combined effect provides for a quick and effective cutting open of the stomach of the bird, even with relatively low pressures of the liquid jet.

It is known on itself that meat or meat products can be cut using a pressurized liquid jet. However this requires pressures in the amount of 3000 bar. If the liquid jet does not entirely get through the meat at such high pressures unaccessible damages of the products occur because the liquid swirls through the meat and pulverizes it. Further for creating these pressures complicated installations are required. The previously mentioned combination effect of cutting and internal pressure however leads to the possibility of a substantial reduction of the required pressure, for example to about 250 bar.

The application of a high pressure liquid jet for cutting open the stomach of a bird also offers a further advantage. Already at cutting open the stomach the contents of the stomach of the bird is flushed and the stomach is cleansed. Separate devices for cleansing the stomach after cutting it open, such as rotating brushes or alike, then can be left out.

The apparatus according to the invention is characterized in that the cutting means consists of at least one nozzle for ejecting a high-pressure liquid jet.

In accordance to a preferred embodiment of the apparatus according to the invention the nozzle is oriented such as to eject the liquid jet in upward direction, whereas the positioning means comprise a conveyor for conveying the stomach to be cut open overhead the nozzle.

If the stomach is cut open by the liquid jet leaving the nozzle the internal surface of the stomach uncovered then is directed downwards, such that the contents of the stomach can be flushed downwards by the liquid without contaminating the outer surface of the stomach.

Further it is advantageous if, according to another embodiment of the apparatus according to the invention, the nozzle is displaceable towards or away from the stomach to be processed. As a result the nozzle can be positioned at the ideal distance from the stomach for an optimised cutting operation. It also may be advantageous if the nozzle is spring-loaded towards the stomach to be processed. Thus the nozzle automatically adapts itself to the shape of a passing stomach. In this connection according to a constructively simple embodiment the nozzle is mounted at the outer end of an arm pivoting in a vertical plane, said outer end engaging the stomach through guiding means. The guiding means may comprise at least one follower roll. The follower roll follows the contour of the stomach to be processed, thus providing an automatic adaption of the position of the nozzle to the passing stomach.

The apparatus for cutting open the stomach of a bird according to the invention may be part of several apparatuses for processing slaughtered poultry known per se, such as a stomach peeler for peeling the stomach of a bird.

BRIEF DESCRIPTION OF THE DRAWINGS

Hereinafter the invention will be elucidated with reference to the drawing, in which an embodiment of the apparatus according to the invention is illustrated.

DETAILED DESCRIPTION OF THE PREFERRED EMBODIMENTS

Figure 1:
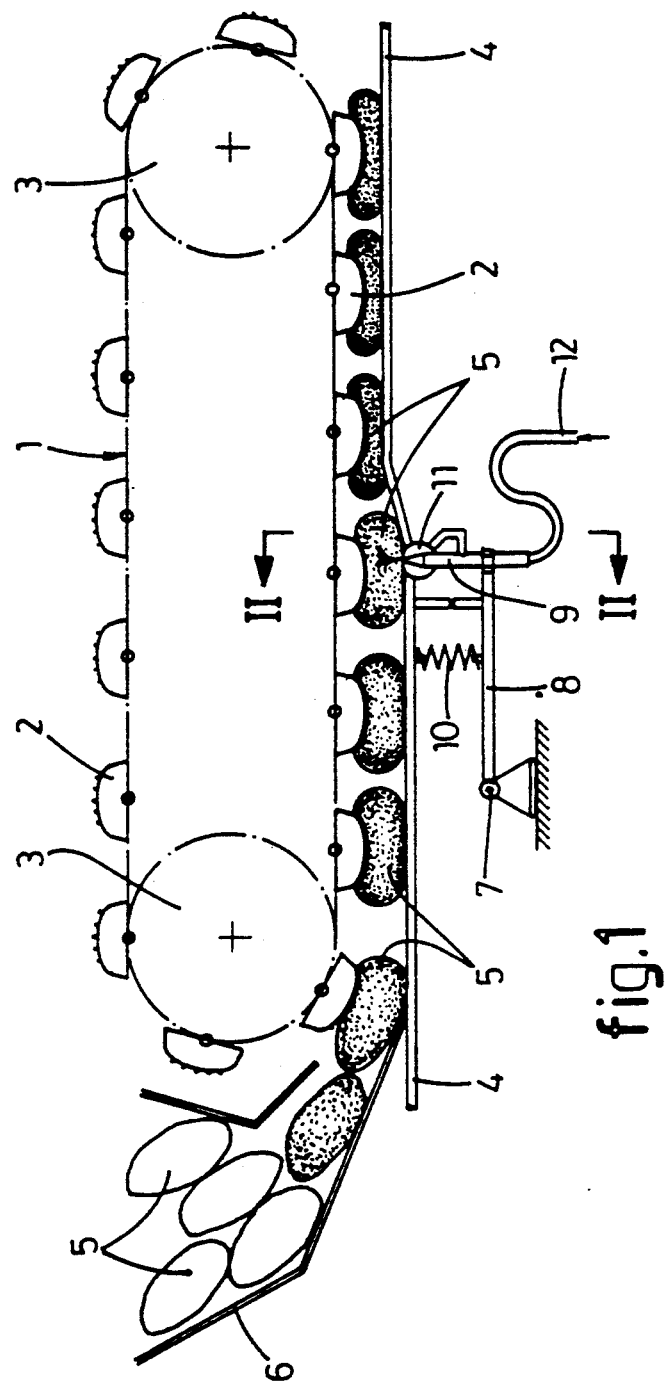
FIG. 1 shows schematically and in a side elevational view an embodiment of the apparatus according to the invention.
Figure 2:
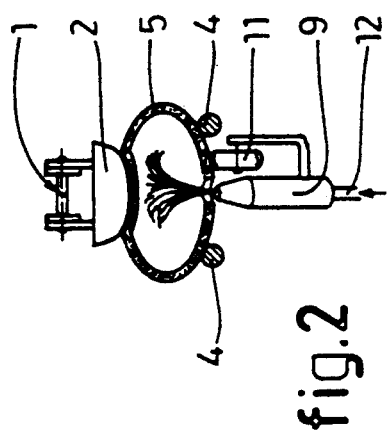
FIG. 2 shows on a larger scale a cross section according to II—II in repeat use of reference characters in the following specification and appended drawings is in-

The apparatus for cutting open the stomach of a bird illustrated in FIG. 1 comprises a conveyor shaped as a chain 1 with carriers 2. The chain 1 runs around chain wheels 3. Below the lower part of the chain 1 a number of guidings 4 extend, for example shaped as guiding rods. As appears from FIG. 1 the illustrated embodiment comprises two guidings 4.

The stomachs 5 to be cut open are supplied through a hopper 6. The stomachs 5 decend along the hopper and are gripped by the carriers 2 of chain 1 and are moved along the guidings 4, in the drawing from left to right.

Below the chain 1 an arm 8 pivoting around a pivot 7 is provided which carries a nozzle 9 at its free outer end. The arm 8 is upwardly loaded by a spring 10.

Apart from the nozzle 9 the arm 8 also carries a follower roll 11 near its free outer end.

The nozzle 9 is connected to a, not illustrated, source for providing pressurized liquid through a hose 12. The liquid may consist of water.

The operation of the apparatus is as follows: the stomachs 5 supplied through the hopper 6 are moved along the guidings 4 by the carriers 2 of the chain 1. When a stomach 5 passes the nozzle 9 the follower roll 11 engages the lower side of the stomach thus pivoting the arm 8 against the spring load of the spring 10 towards such a position that the nozzle 9 is at a favorable distance from the stomach 5 for carrying out its cutting action. When the stomach 5 passes overhead the nozzle 9 the highly pressurized liquid jet leaving the nozzle 9 cuts open the respective stomach wall, as a result of which the liquid jet also may enter the stomach cavity. Due to the cutting action of the liquid jet and the pressure created by the liquid jet entering the stomach cavity the respective stomach wall is cut open quickly and effectively.

Already while cutting open, and afterwards, the stomach contents are flushed from the stomach by the liquid jet. For the stomach faces downwardly with its cut open side the stomach contents cannot spoil the remainder of the stomach.

After passing the nozzle 9 the stomach 5 is folded open by the guidings 4, which are correspondingly shaped, and in some cases is supplied to an apparatus for a further operation (not illustrated). For example such an apparatus may comprise a stomach peeler.

The invention is not limited to the embodiment described before which may be varied widely within the scope of the invention. It will be apparent to those skilled in the art that various modification and variations can be made in the apparatus and method of the present invention without departing form the scope and spirit of the invention. Thus, it is intended that the present invention cover the modifications and variations of this invention provided they come with the scope of the appended claims and their equivalents.

I claim:

1. A method for cutting open the stomach of a bird by cutting through one side of the stomach wall without causing damage to stomach wall opposite the cut, said method comprising the steps of:
   orienting the stomach so that an area of the stomach wall is presented for cutting therethrough;
   slicing through the stomach wall presented for cutting with a pressurized liquid jet, the pressurized liquid jet being of a pressure sufficient to cut through the stomach wall and thereafter dissipating within the stomach cavity so that the opposite stomach wall is not damaged; and
   pressurizing the stomach cavity with the pressurized liquid jet so that the internal volume of the stomach increases causing the stomach wall to tear along the cut made by the pressurized liquid jet.

2. The method according to claim 1, further comprising conveying the stomach across the pressurized liquid jet, the pressurized liquid jet being stationary relative to the stomach being conveyed thereby so that the pressurized liquid jet slices through the stomach wall and pressurizes the stomach cavity as the stomach is conveyed past.

3. The method according to claim 2, further comprising positioning the pressurized liquid jet below the stomach so that the stomach wall of the bottom side of the stomach is cut thereby exposing the stomach cavity from below.

4. The method according to claim 3, further comprising flushing the contents from the stomach cavity with the pressurized liquid jet, the contents of the stomach being flushed from with the liquid from the pressurized liquid jet that drains from the stomach cavity.

5. The method according to claim 2, further comprising conveying a continuous series of stomachs across the pressurized liquid jet.

6. A method for cutting and cleaning a continuous supply of bird stomachs, the method comprising:
   presenting the stomachs to guiding means;
   disposing a jet nozzle at a predetermined position below the guiding means, the jet nozzle being connectable to a pressurized liquid source;
   producing a pressurized liquid jet from the pressurized liquid source through the jet nozzle;
   conveying the stomachs in single file along the guiding means past the jet nozzle;
   slicing through the stomach wall and exposing the internal cavity of each stomach with the pressurized liquid jet as the stomachs are conveyed past the jet nozzle, the pressurized liquid jet dissipating within the internal cavity o f the stomachs;
   pressurized the internal cavity of each stomach with the pressurized liquid from the pressurized liquid jet thereby causing the stomach to tear along the cut being made by the pressurized liquid jet; and
   flushing the contents from the internal cavity of the stomachs with the pressurized liquid from the pressurized liquid jet.

7. The method as in claim 6, wherein said step of disposing the jet nozzle at a predetermined distance below the guiding means includes repositioning the nozzle for each stomach conveyed therepast so that a predetermined distance is maintained between the nozzle and each stomach to be cut.

8. An apparatus for cutting open the stomach of a bird, comprising:
   means for generating a pressurized liquid jet of a pressure just sufficient to penetrate the stomach wall and thereafter dissipate within the stomach cavity; and
   means for positioning said stomach relative to said pressurized liquid jet so that a portion of the stomach wall of said stomach is exposed to said pressurized liquid jet so that said pressurized liquid cuts through said stomach wall and thereafter dissipate within the stomach cavity thereby internally pressurizing said stomach and causing said stomach to tear along the cut made by said pressurized liquid jet.

9. The apparatus as in claim 8, wherein said means for generating said pressurized liquid jet comprises a pressurized liquid source and a jet nozzle connectable to said pressurized liquid source.

10. The apparatus as in claim 9, wherein said jet nozzle is disposed below said means for positioning said stomach so that said pressurized liquid jet is directed upwards towards said stomach cutting through the bottom of said stomach.

11. The apparatus as in claim 10, wherein said means for positioning said stomach comprises guiding members, a conveyor, and at least one gripping member carried by said conveyor for gripping and conveying said stomach to be cut along said guiding members past said jet nozzle, said jet nozzle being stationary relative to said stomach being conveyed by said conveyor.

12. The apparatus as in claim 11, wherein said guiding members are shaped so as to fold open said stomach being conveyed therealong once said stomach has been cut by said pressurized liquid jet.

13. The apparatus as in claim 11, further comprising a plurality of said gripping members so that said conveyor and said gripping members can convey a continuous supply of stomachs past said jet nozzle.

14. The apparatus as in claim 9, wherein said jet nozzle is displaceable relative to said stomach so that a predetermined desired distance can be maintained between said jet nozzle and said stomach.

15. The apparatus as in claim 14, further comprising means for automatically positioning said jet nozzle relative to said stomach.

16. The apparatus as in claim 15, wherein said jet nozzle is mounted on a spring loaded pivoting arm, said pivoting arm pivotable in a vertical plane relative said stomach, and further comprising at least one follower roll operatively connected to said jet nozzle and said pivoting arm for engaging said stomach and maintaining said jet nozzle at a predetermined distance from said stomach.

17. An apparatus for processing a continuous supply of bird stomachs, comprising:
a conveyor system for receiving said stomachs and orienting said stomachs in single file;
guiding members disposed generally below said conveyor system and cooperating with said conveyor system so that said stomachs are conveyed along said guiding members in single file;
a nozzle disposed below and between said guiding members and fixed in position relative said conveyor system, said conveyor system conveying said stomachs above and past said nozzle along said guiding members;
a pressurized liquid source connectable to said nozzle so that pressurized liquid jet can be ejected from said nozzle; and
means for automatically positioning said nozzle relative each said stomach being conveyed thereby so that a predetermined distance is maintained between each said stomach and said nozzle,
whereby said pressurized liquid jet from said jet nozzle slices through the stomach wall of said stomachs being conveyed therepast and internally pressurizes said stomachs causing said stomachs to tear along the cut made by said pressurized liquid jet, said pressurized liquid jet flushing the contents of said stomachs out the cut in said stomach wall of each stomach.

* * * * *